Nov. 25, 1952  J. P. COLE ET AL  2,618,788
HAMMOCK SUPPORTING ASSEMBLY
Filed Aug. 5, 1946  2 SHEETS—SHEET 1

INVENTORS
JOHN P. COLE AND
WILLIAM A. WINTERS Sr.
BY
Mason & Graham
ATTORNEYS

Nov. 25, 1952  J. P. COLE ET AL  2,618,788
HAMMOCK SUPPORTING ASSEMBLY
Filed Aug. 5, 1946  2 SHEETS—SHEET 2

INVENTORS
JOHN P. COLE AND
WILLIAM A. WINTERS Sr.
BY
Mason & Graham
ATTORNEYS

Patented Nov. 25, 1952

2,618,788

UNITED STATES PATENT OFFICE 2,618,788

HAMMOCK SUPPORTING ASSEMBLY

John P. Cole and William A. Winters, Sr., Los Angeles, Calif.; said Winters assignor to said Cole Application August 5, 1946, Serial No. 688,442

9 Claims. (Cl. 5—128)

The present invention relates to a hammock assembly and more particularly to a hammock having a supporting frame with an adjustable canopy therefor.

Numerous arrangements have been devised for providing a supporting frame for a hammock and some of these frames have been provided with canopies for shielding the occupant of a hammock supported in the frame from the sun and from the elements. Some of these prior devices, while usable, are difficult and expensive to manufacture, subject to possible structural weakness, and unwieldy to set up and take down.

An object of the present invention is to make an improved and simplified hammock assembly.

Another object is to make a hammock supporting frame adapted to be mounted on any reasonably level area, such as in a garden or patio, the frame being made of assembled sections.

Another object is to make an improved demountable sectional hammock supporting frame assembly, the members of which are smoothly contoured, and of a novel design for facility in manufacture and strength of the resultant product.

Another object is to connect frame members of a hammock supporting frame by socketed Y members formed of complementary semi-circular channeled members welded together to form elements of tubular cross section, these Y members being adapted to be jointed to adjacent frame members by relatively telescoping joints.

In order to attain these objects there is provided, in accordance with one feature of the invention, a central tubular frame structure with a pair of Y end frame fittings formed of complementary semi-circular elements welded together to provide a structure of tubular cross section each having a notched out area adapted to receive a mounting device for mounting a hammock and a canopy therein. These end fittings, together with interfitted tubular structural elements, provide a four-legged arched support adapted to swing a hammock thereon, and adjustably to support a canopy having laterally arching support means embodied therein over the hammock area of the device.

These and other objects and advantages of the invention will be more fully set forth in the following description and in the accompanying drawings, of which there are two sheets. In the drawings.

Figure 8:
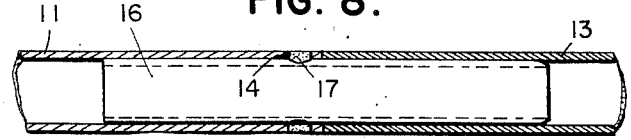
Fig. 8 is a longitudinal sectional view through a telescopically joined portion of the frame.
Figure 10:
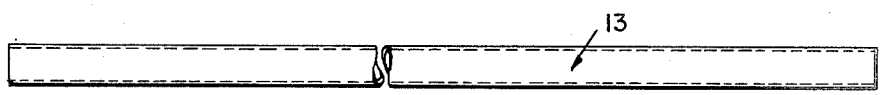
Fig. 10 is a side elevational view of a section of pipe prior to bending and forming to make a Y frame member.

Referring to the drawings in detail, a hammock frame 10 comprises a central tubular frame member 11 with a pair of similar top Y frame end members 12 and 13 connected thereto. The connection between the central tubular member 11 and the top end members 12 and 13 may be by means of a telescopic joint as illustrated in Fig. 8. The connection in Fig. 8 is made by drilling a plurality of holes 14 near the end of one of the joining tubular members, for example the member 11, and inserting a short piece of tubing 16 of a size to have a telescopic fit therein into the end of the member 11 thus drilled. Plug welds 17 then are formed in the holes, welding the outer tube 11 and inner tube 16 together as a substantially unitary structure.

Figure 4:
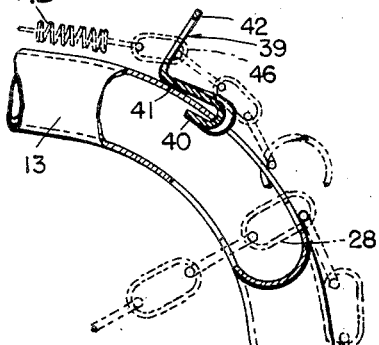
Fig. 4 is an enlarged fragmentary side elevational view of a portion of a Y end frame member, a portion of the side thereof being broken away, hammock and canopy supporting chains being shown in dotted lines.

The short tubular member 16 projects beyond the end of the member 11 in which it thus is inserted, and the projecting end portion of the tube 16 is adapted to be inserted telescopically into the end of the abutting tubular member 13 to be joined thereto. The central member 11 thus may be joined to the upper end Y members 12 and 13 by strong and inconspicuous joints. The upper end Y members 12 and 13 are each bent downward near their outer ends as shown in Figs. 4 and 5.

Figure 11:
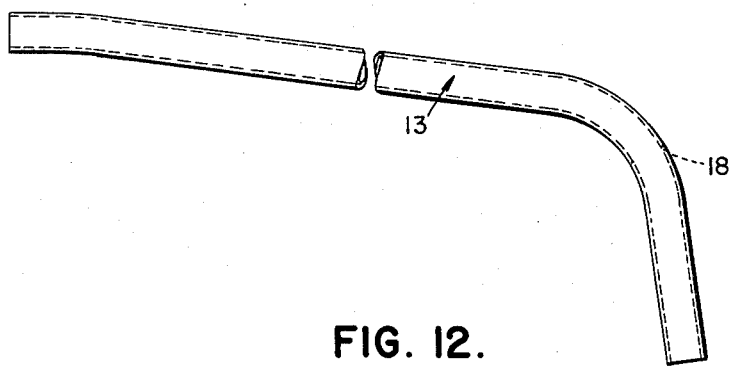
Fig. 11 is a view in side elevation of the pipe shown in Fig. 10 after initial bending and slotting thereof.
Figure 12:
Fig. 12 is a plan view of the bent and slotted pipe shown in Fig. 11.
Figure 13:
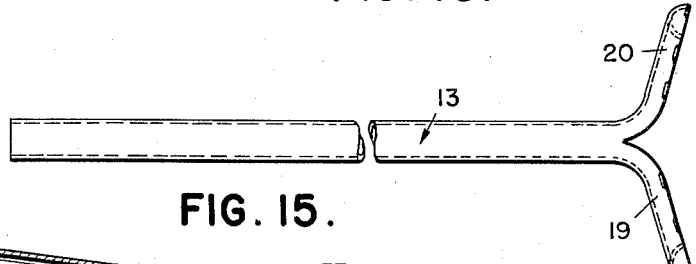
Fig. 13 is a plan view similar to Fig. 12 with the lower ends of the pipe on opposite sides of the slot therein bent outwardly away from each other to the form shown in Fig. 5.

In the form of construction illustrated in Figs. 4, 5, 11, 12 and 13, the lower end of this downwardly bent portion is slotted at 18 in a vertical median plane of the tube to a point just above a straight outer end portion thereof, as best illustrated in Figs. 11 and 12. The lower end divisions 19 and 20 of the tube on opposite sides of the slot then are bent outwardly away from each other, as illustrated in Fig. 13 to an angle which may be approximately 30° from the center plane so as to have an included angle between these outwardly bent legs of approximately 60°.

Figure 5:
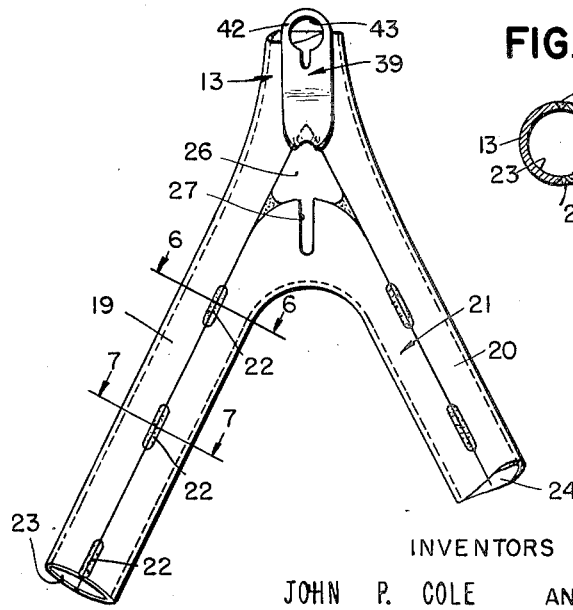
Fig. 5 is an end elevational view of the fragment shown in Fig. 4 with the chains removed.
Figure 7:
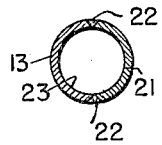
Fig. 7 is a similar sectional view taken on the line 7—7 of Fig. 5.

A second piece 21 of similar tubular stock then is divided on a median plane and is bent reversely in the form of an inverted V so as to fit between the outwardly bent legs 19 and 20 of the members 12 and 13, as illustrated in Fig. 5. This piece 21 is welded in place as by the welds 22 so that, together with the semi-circular legs 19 and 20, it forms a pair of substantially tubular sockets 23 and 24 with their axes disposed at an angle of approximately 60° from each other.

By mounting the inverted V-shaped member 21 in this manner, a triangular opening 26 (see Fig. 5) is left between the curved upper portion of the inverted V-shaped member 21 and the apex of the division between the legs 19 and 20. The outer upper edge of the inserted member 21 which thus is left exposed in this triangular space has a notch 27 cut therein to receive a link of a hammock supporting chain 28. The method of mounting the link in this notch is best illustrated in Fig. 4, the chain being secured against slipping by the next successive link, which rests transversely against the outer face of the notch.

Figure 1:
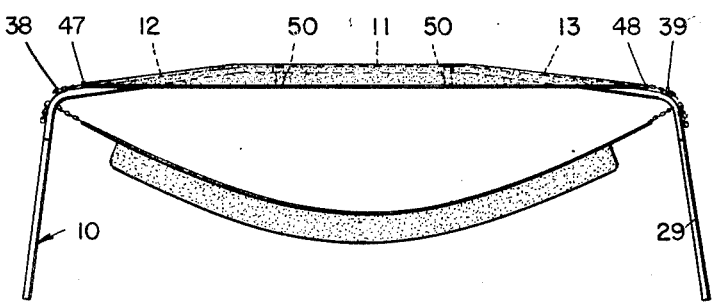
Fig. 1 is a view in side elevation of the present invention showing a hammock support frame having a hammock swung therein and with a protective canopy mounted thereover.
Figure 2:
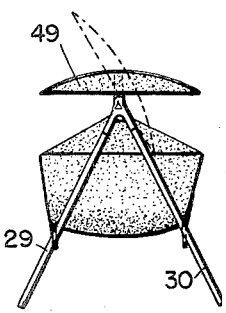
Fig. 2 is an end elevational view of the arrangement shown in Fig. 1, a canopy being shown in normal position in solid lines and in tilted adjusted position in dot-dash lines.
Figure 3:
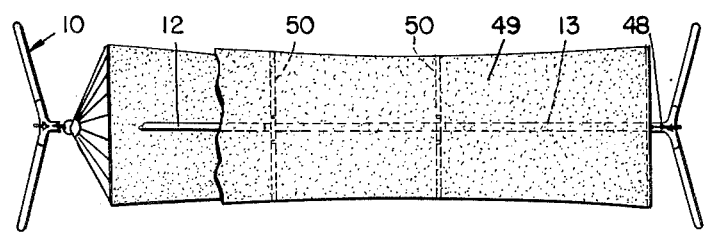
Fig. 3 is a plan view of the arrangement shown in Figs. 1 and 2, a portion of a protective canopy being broken away and a portion of a transverse tubular frame member being broken away.
Figure 6:
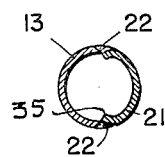
Fig. 6 is a transverse sectional view taken on the line 6—6 of Fig. 5.
Figure 15:
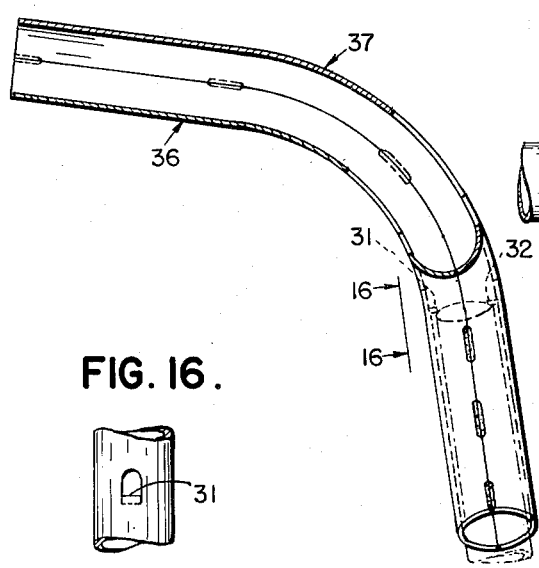
Fig. 15 is a view in side elevation of a modified form of Y connection.
Figure 16:
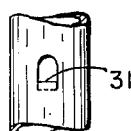
Fig. 16 is a fragmentary side elevational view taken as looking in the direction of the arrows 16—16 in Fig. 15, and showing an inwardly bent stop tab for limiting the insertion of a tubular leg member.

A pair of tubular support legs 29 and 30 are mounted one in each of the tubular sockets 23 and 24. The legs may be mounted in the sockets in the same manner as is illustrated in Fig. 8 or, if desired, legs of smaller diameter, of a size to fit telescopically within the sockets may be provided as illustrated in Figs. 6, 15 and 16. If the smaller diameter legs are used, it is desirable to provide a stop to limit the insertion of the tubular leg members in their sockets. Such stops may be provided by cutting tabs 31 and 32 in the side walls of the sockets and bending these tabs inwardly to engage the upper ends of the inserted tubes. In the form of stop illustrated in Fig. 6, the side wall of one of the semi-tubular members is deformed inwardly as at 35 before welding so as to provide an area of smaller internal diameter at that point.

Figure 14:
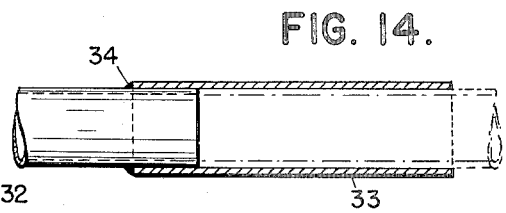
Fig. 14 is a sectional view through a ferrule showing an alternate method of joining the tubular frame members to each other.

If desired, an exterior telescoping connection may be provided as illustrated in Fig. 14. In this construction a length 33 of tubing of larger diameter than the interfitting members, such as the members 11 and 12, is welded as at 34 to one of the members and is positioned to project beyond the end of the member to which it is welded. The other member then can be inserted telescopically into this larger tubular section. The abutting of the ends of the interfitted tubular members serve to limit the depth of insertion.

A modified form of Y connection is illustrated in Fig. 15. In this construction two stampings 36 and 37 of Y-shaped and semi-circular cross sectional form are provided, and are adapted to fit together edge to edge to form a tubular Y fitting substantially as is illustrated in Fig. 5. The parts are welded together at several points along their abutting edges to make a curved Y-shaped member of substantially tubular cross section.

A pair of canopy supporting hooks 38 and 39 may be made of bent band iron with a reversely bent hook portion 40 adapted to have hooked engagement in the triangular opening 26 with the apex of the outer slot in the Y member. A flat portion 41 of the hook is adapted to rest against the outer upper curved face of the Y member, and an upright bent portion 42 of the hook has a keyhole slot 43 therein.

The upper end of the keyhole slot is of a size to permit a link canopy support chain 46 to pass freely therethrough while the narrow lower end portion of the slot is of a size to permit the chain to be held therein, as illustrated in Fig. 4. A rather strong coil spring 55 is mounted in one of the canopy chains. The canopy support chains are connected one to each of a pair of end bars 47 and 48 mounted one on each end of a canvas canopy 49.

Figure 9:
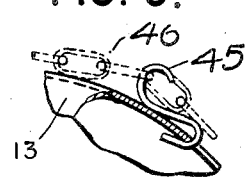
Fig. 9 is a fragmentary view similar to the upper portion of Fig. 4, showing a modified form of hook for securing the canopy supporting chain to the Y frame member.

In the modified canopy hook shown in Fig. 9, a short length of steel rod is bent into the form of an S hook 45, one end of the hook being inserted in the triangular opening 26, and the other end being hooked into the canopy support chain 46.

The canopy 49 has a pair of flexible rods sewed into pockets transversely of the canopy so as to rest approximately on the inner downturned portion of the Y end members 12 and 13. These flexible transverse rods 50 bow downwardly under increased tension on the canopy support chains 47 and 48. Frictional engagement between the flexible transverse rods 50 and the frame 10 hold the canopy in tilted adjusted position. By this means an occupant of the hammock can tilt the canopy to a desired angle merely by reaching up and grasping the edge of the canopy and pulling it slightly to one side or the other, the canopy tending to tilt to the side toward which it is moved away from a central position on the frame.

The device comprises a simple, sturdy and attractive appearing hammock support assembly which is adapted to quantity production. It may easily be transported and shipped in a knocked down condition. The provision of the flexible transverse members in the canopy greatly improves its functioning and adjustability and add substantially to the life of the canopy.

We claim:

1. A hammock supporting assembly comprising a frame having a central top frame member, a pair of downwardly and outwardly sloping tubular top end members, telescopically connected thereto, the outer ends of said top end members being bent downwardly at an angle approaching the perpendicular from the central top member, the downwardly bent outer ends of said top end members being divided longitudinally on a vertical plane, the portions thereof on opposite sides of the plane of division being separated at a divergent angle, a reversely bent member of semi-circular cross section having substantially the same diameter of transverse curvature as the tubes of said end members interfitted between the separated divergent ends of said upper end members and welded thereto to provide a pair of divergent downwardly directed sockets, a pair of tubular legs having telescopic connection with said sockets, a canopy mounted over the upper portion of said frame and means for supporting a hammock between the outer ends of the socketed upper end members.

2. A hammock supporting frame having a central top frame member, a pair of tubular top end members connected thereto, the outer ends of said top end members being bent downwardly from the central top member, the downwardly bent outer ends of said top end members having a pair of legs of semi-circular cross section disposed at a divergent angle to each other, a member of semi-circular cross section having substantially the same diameter of transverse curvature as the tube of said end member fitted to said top end member and welded thereto to provide a pair of divergent downwardly directed sockets and a pair of tubular legs having telescopic connection with said sockets.

3. A hammock supporting assembly comprising a frame having a central top frame member, a pair of downwardly and outwardly sloping tubular top end members telescopically connected thereto, the outer ends of said top end members being bent downwardly at an angle approaching the perpendicular from the central top member, the downwardly bent outer ends of said top end members being divided longitudinally on a vertical plane, the portions thereof on opposite sides of the plane of division being separated at a divergent angle, a member of semi-circular cross section having substantially the same diameter of transverse curvature as the tube of said end members fitted edgewise to the separated divergent ends of said upper end members and welded thereto to provide a pair of divergent downwardly directed sockets, a pair of tubular legs having telescopic connection with said sockets, a canopy mounted over the upper portion of said frame and means for supporting a hammock between the outer ends of the socketed upper end members, the hammock supporting means exerting a tensile stress on the top frame members to draw them toward a relatively assembled relation.

4. A hammock supporting assembly comprising a frame having a central top frame member, a pair of downwardly and outwardly sloping tubular top end members telescopically connected thereto, the outer ends of said top end members being bent downwardly at an angle approaching the perpendicular from the central top member, the downwardly bent outer ends of said top end members being divided longitudinally on a vertical plane, the portions thereof on opposite sides of the plane of division being separated at a divergent angle, a reversely bent member of semi-circular cross section having substantially the same diameter of transverse curvature as the tube of said end members, said reversely bent member being interfitted between the separated divergent ends of said upper end members and welded thereto to provide a pair of divergent downwardly directed sockets, the reversely bent member terminating short of the apex of the division of the outer ends of said top end members, the upper edge of the reversely bent member having a chain receiving and locking notch therein, a canopy mounted over the upper portion of said frame and a hammock having a chain secured to each end thereof, each chain having interlocking connection with a notch in said reversely bent member.

5. A hammock supporting assembly comprising a frame having a central top member and having a pair of tubular top end members, the outer ends of said top end members being bent downwardly at an angle approaching the prependicular from the central top member, the downwardly bent outer ends of said top end members being divided longitudinally thereof and terminating in a pair of semi-tubular divergent legs, a complementary member of semi-circular cross section having substantially the same diameter of transverse curvature as said end members fitted to complete the tubular form of the divergent legs of said upper end members and welded thereto to provide a pair of divergent downwardly directed sockets, a pair of legs of circular cross section having telescopic connection with said sockets, and means for supporting a hammock between the outer ends of the socketed upper end members.

6. A hammock supporting assembly comprising a frame having a central member and a pair of downwardly sloping tubular top end members, the outer ends of said top end members being bent downwardly at an angle approaching the perpendicular from the central top member, the downwardly bent outer ends of said top end members terminating in pairs of divergent downwardly directed sockets, a pair of legs of circular cross section having telescopic connection with said sockets, means for supporting a hammock between the outer ends of the socketed upper end members, a canopy of flexible material, a pair of end stiffening members mounted one in each end of said canopy, resilient adjustable tension means connecting the ends of said canopy to said frame, and a pair of resiliently flexible members inserted transversely of said canopy intermediate the ends thereof, said inserted members being adapted to engage an upper portion of said frame to be bowed downwardly thereby.

7. In a hammock supporting frame having a central top frame member and a pair of legs spaced from each end thereof, the legs of each pair being arranged divergent in the shape of an inverted V, a Y-shaped connection element at each end of said central frame member connecting the same to said legs, and comprising a tubular member having a main section and an end section bent at an angle approaching a right angle to the main section, the end section being divided longitudinally on a vertical plane with the portions thereof on opposite sides of the plane of division being separated at a divergent angle, and a reversely bent member of semi-circular cross section having substantially the same diameter of transverse curvature as said tubular member interfitted between the separated divergent portions of the end section of said tabular member and secured thereto to provide a pair of divergent sockets for said legs.

8. In a hammock supporting frame having a central top frame member and a pair of legs spaced from each end thereof, the legs of each pair being arranged divergent in the shape of an inverted V, a Y-shaped connection element at each end of said central frame member connecting the same to said legs, and comprising a member having a main section and a pair of divergent end sections, said end sections being disposed in the same plane at an angle to the main section and being semi-circular in cross section, and a complementary member having a pair of divergent portions of semi-circular shape in cross section secured to the end sections of said first mentioned member and cooperating therewith to form a pair of sockets for said legs.

9. In a hammock supporting frame having a central top frame member and a pair of legs spaced from each end thereof, the legs of each pair being arranged divergent in the shape of an inverted V, a Y-shaped connection element at each end of said central frame member connecting the same to said legs, and comprising a pair of complementary Y-shaped elements each having a main section and a pair of divergent end sections, said main section and said end sections being of semi-circular shape in cross section, and means securing the elements together in abutting edge relation whereby a tubular Y-shaped element is formed.

JOHN P. COLE.
WILLIAM A. WINTERS, Sr.

REFERENCES CITED

The following references are of record in the file of this patent:

UNITED STATES PATENTS

| Number | Name | Date |
|---|---|---|
| 280,081 | Rich | June 26, 1883 |
| 463,329 | Cottle | Nov. 17, 1891 |
| 1,062,950 | Boss | May 27, 1913 |
| 1,400,049 | Goddard | Dec. 13, 1921 |
| 1,540,408 | Lonn | June 2, 1925 |
| 2,104,917 | Tischlet | Jan. 11, 1938 |
| 2,243,687 | Sutherland | May 27, 1941 |

FOREIGN PATENTS

| Number | Country | Date |
|---|---|---|
| 226,885 | Great Britain | Oct. 11, 1910 |